United States Patent
Chupeau et al.

(10) Patent No.: US 11,979,546 B2
(45) Date of Patent: May 7, 2024

(54) METHOD AND APPARATUS FOR ENCODING AND RENDERING A 3D SCENE WITH INPAINTING PATCHES

(71) Applicant: InterDigital VC Holdings, Inc., Wilmington, DE (US)

(72) Inventors: Bertrand Chupeau, Rennes (FR); Julien Fleureau, Rennes (FR); Franck Thudor, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 17 days.

(21) Appl. No.: 17/438,703

(22) PCT Filed: Feb. 25, 2020

(86) PCT No.: PCT/US2020/019582
§ 371 (c)(1),
(2) Date: Sep. 13, 2021

(87) PCT Pub. No.: WO2020/185383
PCT Pub. Date: Sep. 17, 2020

(65) Prior Publication Data
US 2022/0159231 A1 May 19, 2022

(30) Foreign Application Priority Data
Mar. 14, 2019 (EP) .................................... 19305306

(51) Int. Cl.
*H04N 13/161* (2018.01)
*G06T 3/00* (2006.01)
(Continued)

(52) U.S. Cl.
CPC ......... *H04N 13/161* (2018.05); *G06T 3/0093* (2013.01); *G06T 3/60* (2013.01);
(Continued)

(58) Field of Classification Search
None
See application file for complete search history.

(56) References Cited

U.S. PATENT DOCUMENTS

| | | | |
|---|---|---|---|
| 8,345,751 B2 | 1/2013 | Gunnewick et al. | |
| 2010/0195716 A1* | 8/2010 | Klein Gunnewiek | ....................... H04N 19/597 375/E7.126 |

(Continued)

FOREIGN PATENT DOCUMENTS

EP    3432581 A1    1/2019

OTHER PUBLICATIONS

Barnes et al., "PatchMatch: A Randomized Correspondence Algorithm for Structural Image Editing", ACM Transactions on Graphics, vol. 28, No. 3, 2009, 10 pages.
(Continued)

*Primary Examiner* — Xiaolan Xu
(74) *Attorney, Agent, or Firm* — VOLPE KOENIG

(57) ABSTRACT

Methods, devices and stream are disclosed for encoding, transporting and decoding a 3D scene prepared to be viewed from the inside of a viewing zone. A central view comprising texture and depth information is encoded by projected points of the 3D scene visible from a central point of view onto an image plane. Patches are generated to encode small parts of the 3D scene not visible from the central point of view. At the rendering, a viewport image is generated for the current point of view. Holes, that is dis-occluded areas, of the viewport are filled using a patch based inpainting algorithm adapted to take the patches, warped according to the rotation and translation between virtual camera used for capturing the patch and the current virtual camera.

12 Claims, 5 Drawing Sheets

(51) Int. Cl.
*G06T 3/60* (2006.01)
*G06T 5/00* (2006.01)
*G06T 7/194* (2017.01)
*G06T 15/10* (2011.01)
*H04N 13/00* (2018.01)
*H04N 13/122* (2018.01)
*H04N 13/156* (2018.01)
*H04N 19/597* (2014.01)

(52) U.S. Cl.
CPC .............. *G06T 5/005* (2013.01); *G06T 7/194* (2017.01); *G06T 15/10* (2013.01); *H04N 13/122* (2018.05); *H04N 13/156* (2018.05); *H04N 19/597* (2014.11); *G06T 2200/04* (2013.01); *G06T 2207/10021* (2013.01); *G06T 2207/20021* (2013.01); *H04N 2013/0077* (2013.01); *H04N 2013/0092* (2013.01)

(56) References Cited

U.S. PATENT DOCUMENTS

| | | |
|---|---|---|
| 2015/0097827 A1 | 4/2015 | Cohen et al. |
| 2017/0032563 A1* | 2/2017 | Distler .................... G06T 15/04 |
| 2020/0167943 A1* | 5/2020 | Kim ........................ G06T 7/579 |

OTHER PUBLICATIONS

Lim et al., "Bi-Layer Inpainting for Novel View Synthesis", 18th IEEE International Conference on Image Processing, Brussels, Belgium, Sep. 11, 2011, 4 pages.

* cited by examiner

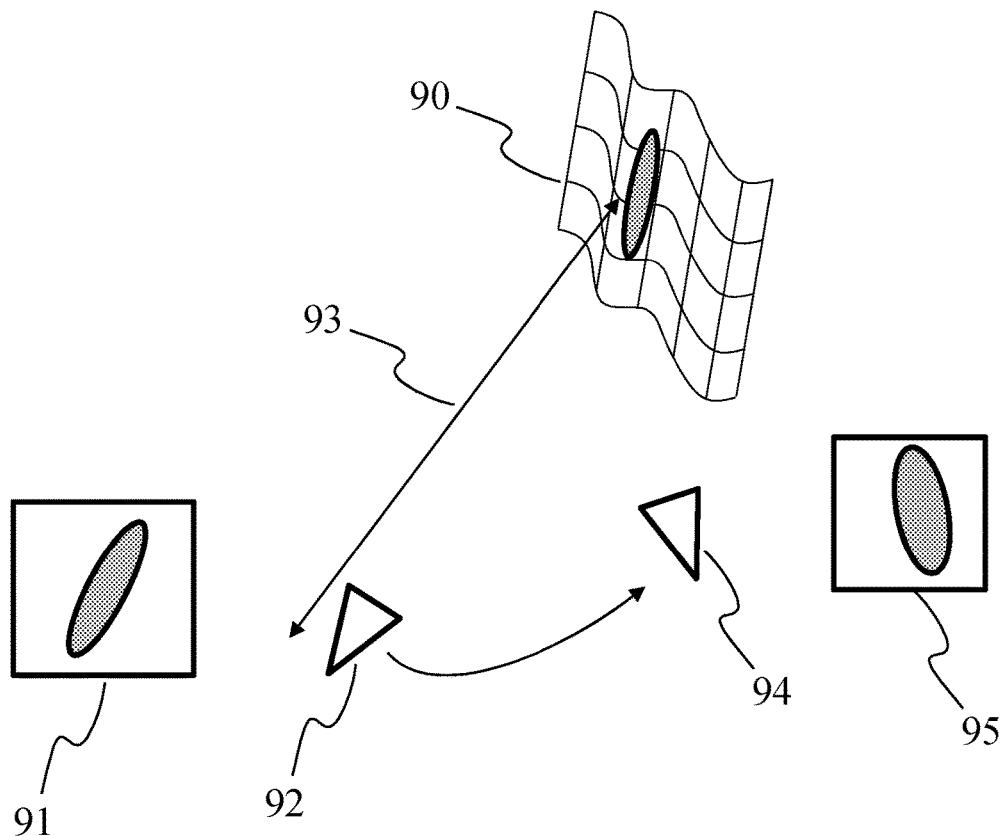
Figure 9
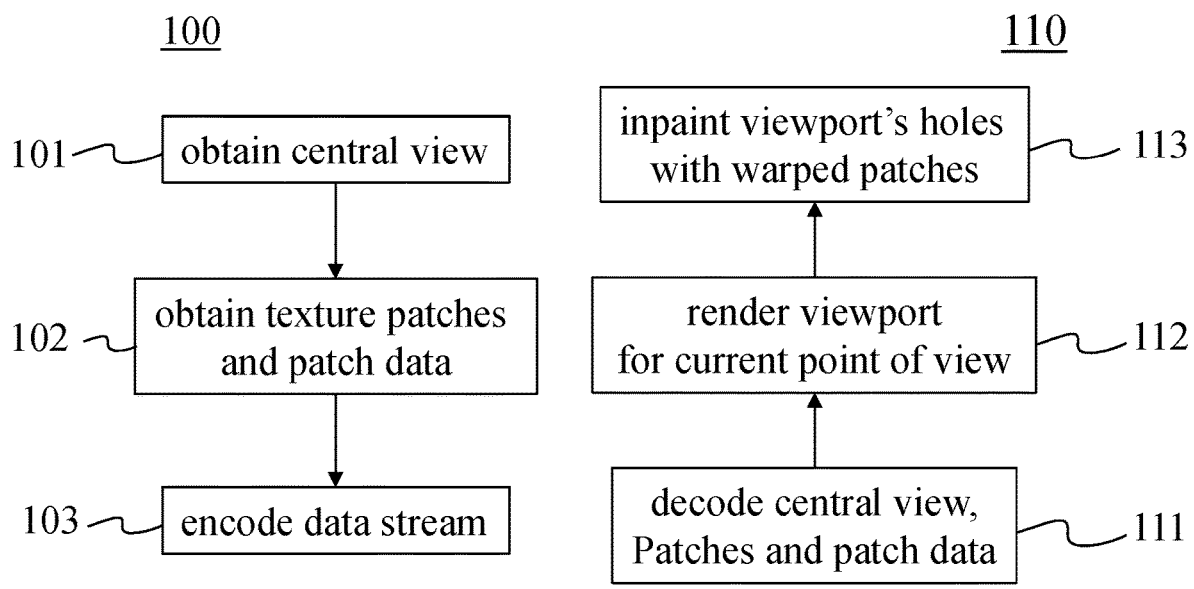
Figure 10
Figure 11

METHOD AND APPARATUS FOR ENCODING AND RENDERING A 3D SCENE WITH INPAINTING PATCHES

This application claims the benefit, under 35 U.S.C. § 371 of International Application PCT/EP2020/019582, filed Feb. 25, 2020, which was published in accordance with PCT Article 21(2) on Sep. 17, 2020, in English, and which claims the benefit of European Patent Application No. 19305306.3, filed Mar. 14, 2019.

1. TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric content on end-user devices such as mobile devices or Head-Mounted Displays (HMD).

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a way to perform such a recording, even if technical difficulties remain.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume called viewing bounding box, allowing limited translation of the head and parallax experience. This second context is a valuable trade-off between free navigation and passive viewing conditions of a seated audience member.

Points visible from the central point of view of a 3D scene prepared for a 3DoF rendering are required to render a 3D scene. Points visible from this central point of view are projected onto a central view image and transmitted to the renderer. Pixels of a central view are not sufficient for a rendering allowing a parallax experience as in a 3DoF+ or 6DoF rendering. At the rendering, as long as the point of view remains at this central location (i.e. in a 3DoF rendering mode), the viewport (that is the image prepared to be displayed) is entirely filled according to the direction of view. However, as soon as the point of view is displaced, some data miss because points not visible from the central point of view have to be rendered. If this information is not available, some holes, corresponding to dis-occluded parts of the 3D scene, appear on the viewport image, creating annoying visual artifacts. To fill these dis-occluded parts, two approaches have been considered.

A technical approach for the encoding of volumetric video is based on the projection of the 3D scene onto a multiplicity of 2D images, called patches, for example packed into atlases which can be further compressed using conventional video encoding standards (e.g., HEVC). At the decoding, depth and color information comprised in pixels of patches, in accordance with metadata representative of their acquisition (i.e. projection and mapping operations), is used to de-project points of the 3D scene. Every point visible from any point of view in a pre-determined viewing zone and in any directions of view are encoded as patches having a color component and a depth component, a patch being associated with metadata comprising parameters for its de-projection. This approach is efficient but requires a huge amount of data.

Another approach consists in filling holes in the viewport with inpainting techniques, for instance with patch based inpainting algorithm like described in "PatchMatch: A Randomized Correspondence Algorithm for Structural Image Editing", by C. Barnes et al., *ACM Trans. on Graphics (Proc. SIGGRAPH)*, Vol. 28, NO. 3, August 2009. A drawback of such an approach is that any dis-occluded part to render in the viewport has to be extrapolated from transmitted visible parts (that is through inpainting techniques). This solution results in annoying artifacts at the borders of foreground objects.

There is a lack for a solution allowing a good trade-off between visual quality of the rendering of dis-occluded parts and the size of data needed for achieving this goal. The present principles propose such a solution.

3. Summary

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method of for encoding a 3D scene according to a viewing zone. The method comprises obtaining a central view of the 3D scene. The view is image data representative of a projection of points of the 3D scene visible from a point of view, for example at a center of the viewing zone onto an image plane. Pixels of the view comprise a color component and a depth component encoding the texture and the geometry of the 3D scene viewed from the point of view. The method also comprises obtaining a set of patches. A patch is associated with a data and is image data representative of a projection of a part of the 3D scene visible from a point of view in the viewing zone, pixels of a patch having at least a color component encoding the texture of the patch. Data associated with a patch, also called patch data item, comprise the description of the pose of a virtual camera associated with the projection point of view and a distance between the projection point of view and the part of the 3D scene. This distance may be determined by different means. The method comprises encoding the view, the set of patches in association with their patch data in a data stream.

The present principles also relate to a device implementing this method and to a stream generated by this method and encoding a 3D scene.

The present principles also relate to a method for rendering a 3D scene for a current point of view located in a viewing zone. The method comprises decoding a view and a set of patches from a data stream, a patch being associated with a data. The view is image data representative of a projection of points of the 3D scene visible from a point of view within the viewing zone, for instance at the center of the viewing zone, onto an image plane, pixels of the view having a color component and a depth component. A patch is image data representative of a projection of a part of the 3D scene visible from different points of view within the viewing zone, pixels of a patch having at least a color component. Data comprise information representative of the pose of the camera corresponding to the projection point of view used to generate the patch and a distance from this projection point of view to said part of the 3D scene. The method comprises rendering the 3D scene viewed from said current point of view onto a viewport image by de-projecting pixels of the view. As the current point of view may be different than the point of view used to project the view, the viewport image comprises at least one scene region, that is filled with information from the view, and at least one dis-occluded region, that is a region where information is missing because this part of the 3D space is not visible from the point of view. The method then comprises inpainting dis-occluded regions of the viewport image with the patches decoded from the data stream. In an embodiment, patches are warped according to the distance in the patch data item, the pose of the virtual camera relative to the current point of view and the pose of the virtual camera relative to the projection point of view.

4. BRIEF DESCRIPTION OF DRAWINGS

The present disclosure will be better understood, and other specific features and advantages will emerge upon reading the following description, the description making reference to the annexed drawings wherein:

FIG. 9 illustrates a patched warped to be used as an input of a patch based inpainting algorithm, according to a non-limiting embodiment of the present principles;

FIG. 10 illustrates a method for encoding a 3D scene prepared to be viewed from a point of view within a viewing zone, according to a non-limiting embodiment of the present principles;

FIG. 11 illustrates a method 110 for rendering a 3D scene for a point of view and a direction of view in a viewing zone, according to a non-limiting embodiment of the present principles.

5. DETAILED DESCRIPTION OF EMBODIMENTS

Figure 1:
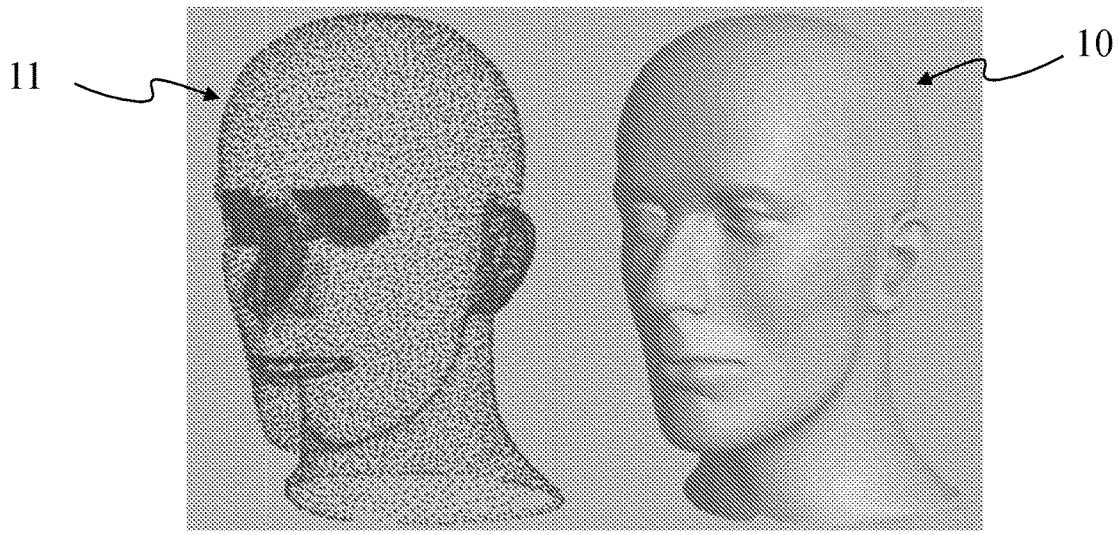
FIG. 1 shows a three-dimension (3D) model of an object and points of a point cloud corresponding to the 3D model, according to a non-limiting embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

In the following, a point of view is a point from which a view is performed as a camera or a virtual camera could work. A point of view is the association of 3D coordinates of a point with a direction of view. So, a point of view is data referring to a camera capturing a scene, comprising the location and the direction of view of the camera and projection parameters of the camera.

According to the present principles, a central view of a 3D scene is captured from a central point of view. The central view is image data representative of the 3D scene viewed from the central point of view. Pixels of the central view comprise a depth component and a color component to be de-projected. In a variant, two central views are generated, one comprising color information and one comprising depth information. According to the present principles, patches that are image data representative of parts of the 3D scene, in particular parts of the 3D scene not visible from the central point of view but visible from another point of view located in the viewing zone are generated and encoded, in association with their metadata, with the central view. Patches have only a color component. The rendered decodes the central view and generate the viewport image with points de-projected from pixels of the central view according to the location and direction of the current view. According to the present principles, holes corresponding to dis-occluded parts of the 3D scene are filled by using a patch based inpainting method which uses color patches decoded from the stream to progressively fill dis-occluded parts. An advantage of the present principles is to avoid visual artifacts due to the inpainting algorithm as patches are not extrapolated from the central view but are acquired from the original 3D scene and, at the same time, to limit the bitrate of the data stream encoding the 3D scene as depth information relative to patches is not encoded.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:

from a capture of a real object shot by a rig of cameras, optionally complemented by depth active sensing device;

from a capture of a virtual/synthetic object shot by a rig of virtual cameras in a modelling tool;

from a mix of both real and virtual objects.

Figure 2:
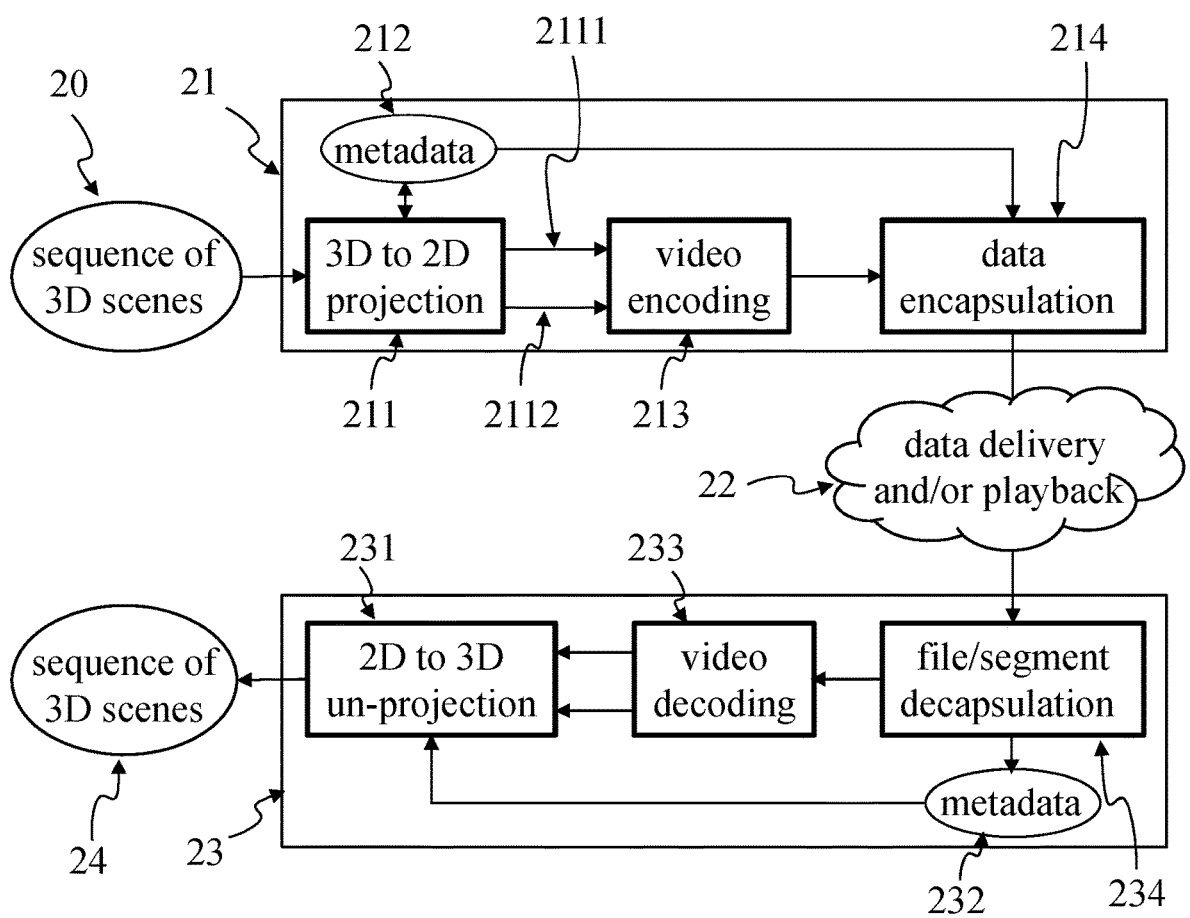
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises color information and depth information representative of the 3D scene projected onto frame 2111. In a variant, color information and depth information are encoded in two separate frames 2111 and 2112.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7.

A video encoding circuit 213 encodes sequence of frames 2111 and 2112 as a video. Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:
JPEG, specification ISO/CEI 10918-1 UIT-T Recommendation T.81, https://www.itu.int/rec/T-REC-T.81/en;
AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-I/en);
3D-HEVC (an extension of HEVC whose specification is found at the ITU website, T recommendation, H series, h265, http://www.itu.int/rec/T-REC-H.265-201612-I/en annex G and I);
VP9 developed by Google; or
AV1 (AOMedia Video 1) developed by Alliance for Open Media.

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the stream from a source 22. For example, source 22 belongs to a set comprising:
a local memory, e.g. a video memory or a RAM (or Random-Access Memory), a flash memory, a ROM (or Read Only Memory), a hard disk;
a storage interface, e.g. an interface with a mass storage, a RAM, a flash memory, a ROM, an optical disc or a magnetic support;
a communication interface, e.g. a wireline interface (for example a bus interface, a wide area network interface, a local area network interface) or a wireless interface (such as a IEEE 802.11 interface or a Bluetooth® interface); and
a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. In a variant, video decoder 233 provides two sequences of frames, one comprising color information, the other comprising depth information. A circuit 231 uses metadata 232 to un-project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

According to the present principles, circuit 211 generates a frame, called central view, by projecting points of the 3D scene visible from a central point of view onto an image plane. Pixels of the central view have a color component and a depth component representative of the color of projected points and of the distance between projected points and the central point of view in the space of the 3D scene. In a variant two central view are generated, one encoding the color component and one encoding the depth component of the central projection. Other parts of the 3D scene, visible from other points in the 3D scene and according to several directions of view are encoded in images, called patches. Only the color component is encoded in a patch. The projection may be the same or may be different than the projection used for the central view. Metadata describing parameters of the projection used for a patch are associated with the patch. In addition, patch data item comprises a distance between the point of view the patch has been acquired from and the part of the 3D scene projected onto this patch. This distance is, for example, an average distance or a median distance or a shortest distance or a longest distance of distances between said point and points of the part of the 3D scene.

According to the present principles, central views and patches are decoded by circuits 234 and 233 and metadata 232 retrieved from the data stream. Pixels of the central views are de-projected, knowing the coordinates of the central point of view (e.g. the origin of a frame of reference of the 3D space of the 3D scene) and according to projection parameters of the central views and depth and color information encoded in the central views. According to the present principles, a viewport image is generated with these de-projected points according to the current location and direction of view. In a 3DoF+ or 6DoF rendering, the current point of view may be different than the central point of view and holes corresponding to dis-occluded parts are present in the viewport image. According to the present principles, these holes are filed by using a patch based algorithm which, instead of using patches created from the current viewport image, uses color patches decoded from the stream according to associated patch data.

Figure 3:
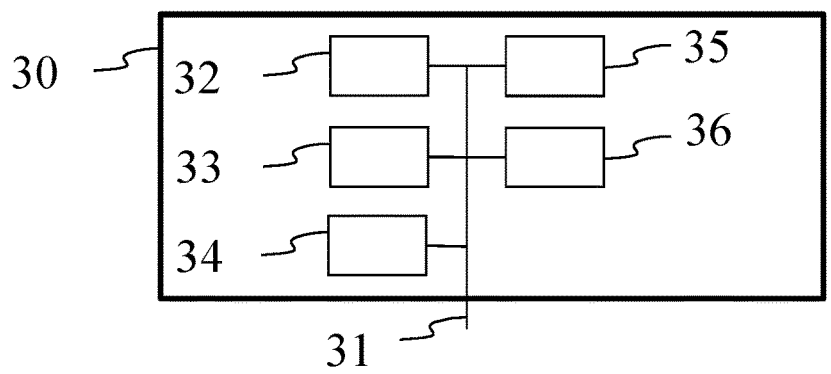
FIG. 3 shows an example architecture of a device which may be configured to implement a method described in relation with FIGS. 10 and 11, according to a non-limiting embodiment of the present principles.

FIG. 3 shows an example architecture of a device 30 which may be configured to implement a method described in relation with FIGS. 10 and 11. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:
- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 10 and 11, and belongs to a set comprising:
- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

Figure 4:
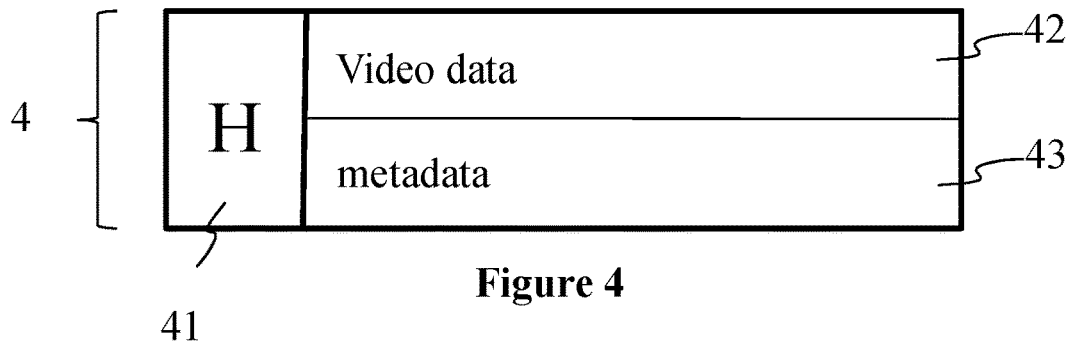
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards).

Figure 5:
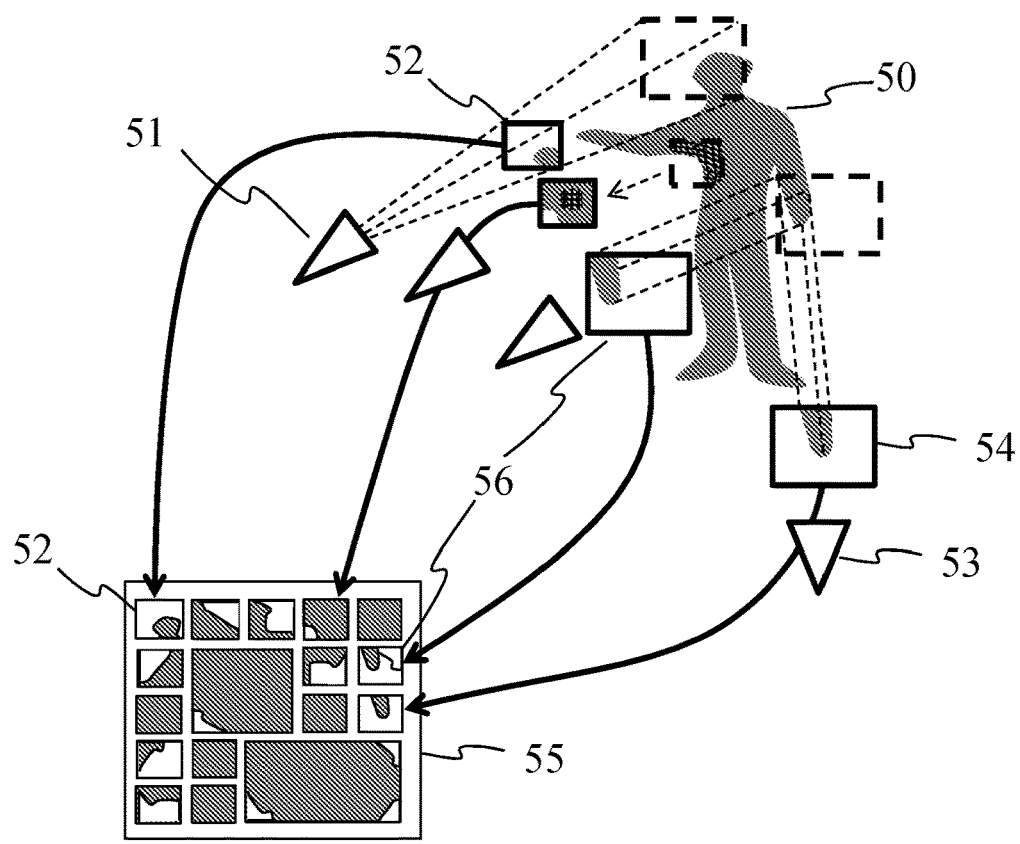
FIG. 5 illustrates a spherical projection from a central point of view, according to a non-limiting embodiment of the present principles.

FIG. 5 illustrates the patch atlas approach with an example of 4 projection centers. 3D scene 50 comprises a character. For instance, center of projection 51 is a perspective camera and camera 53 is an orthographic camera. Cameras may also be omnidirectional cameras with, for instance a spherical mapping (e.g. Equi-Rectangular mapping) or a cube mapping. The 3D points of the 3D scene are projected onto the 2D planes associated with virtual cameras located at the projection centers, according to a projection operation described in projection data of metadata. In the example of FIG. 5, projection of the points captured by camera 51 is mapped onto patch 52 according to a perspective mapping and projection of the points captured by camera 53 is mapped onto patch 54 according to an orthographic mapping.

The clustering of the projected pixels yields a multiplicity of 2D patches, which are packed in a rectangular atlas 55. The organization of patches within the atlas defines the atlas layout. In an embodiment, two atlases with identical layout: one for texture (i.e. color) information and one for depth information. Two patches captured by a same camera or by two distinct cameras may comprise information representative of a same part of the 3D scene, like, for instance patches 54 and 56.

The packing operation produces a patch data for each generated patch. A patch data comprises a reference to a projection data (e.g. an index in a table of projection data or a pointer (i.e. address in memory or in a data stream) to a projection data) and information describing the location and the size of the patch within the atlas (e.g. top left corner coordinates, size and width in pixels). Patch data items are added to metadata to be encapsulated in the data stream in association with the compressed data of the one or two atlases.

Figure 6:
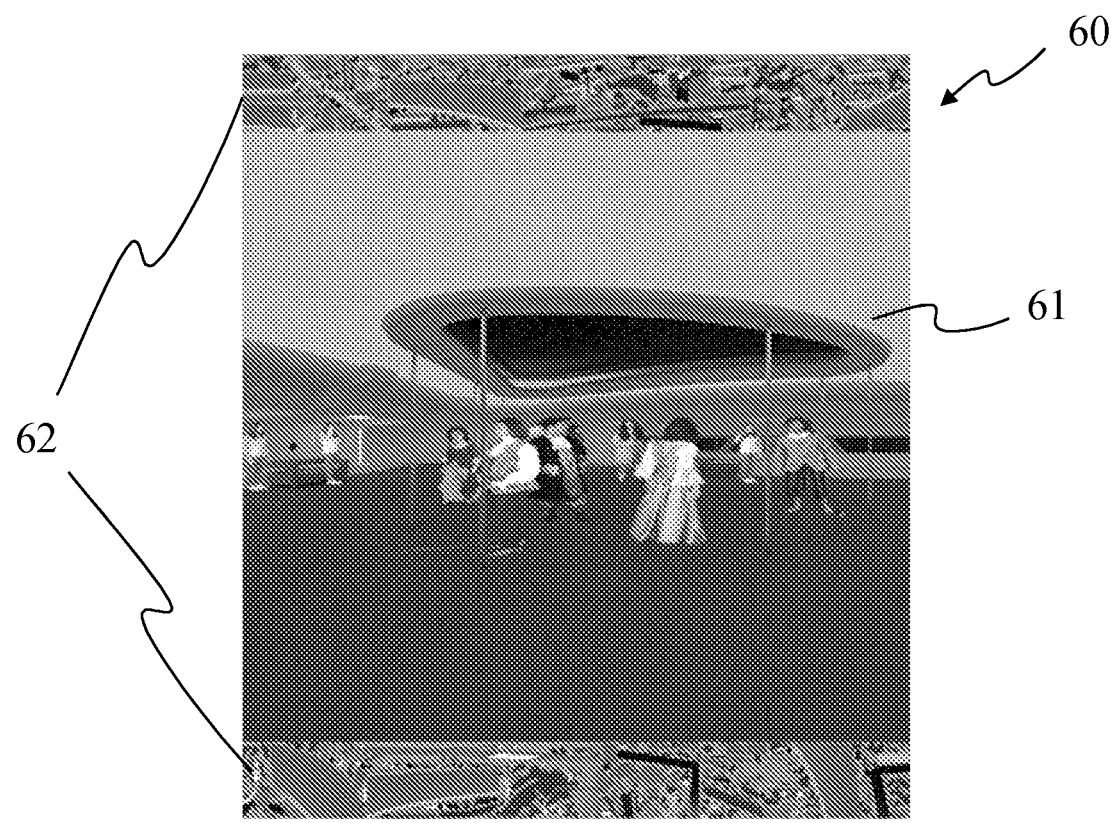
FIG. 6 shows an example of an atlas comprising the texture information of the points of a 3D scene, according to a non-limiting embodiment of the present principles.

FIG. 6 shows an example of an atlas 60 comprising the texture information (a.k.a. color component, e.g. RGB data or YUV data) of the points of a 3D scene, according to a non-limiting embodiment of the present principles. As explained in relation to FIG. 5, an atlas is an image packing patches, a patch being a picture obtained by projecting a part of the points of the 3D scene.

In the example of FIG. 6, atlas 60 comprises a central view 61 comprising the texture information of the points of the 3D scene that are visible from a point of view and one or more second parts 62. The texture information of the central view 61 may for example be obtained according to an equirectangular projection mapping, an equirectangular projection mapping being an example of spherical projection mapping. In the example of FIG. 6, the second parts 62 are arranged at the left and right borders of central view 61 but the second parts may be arranged differently. Second parts 62 comprise texture information of parts of the 3D scene that are complementary to the part visible from the point of view. The second parts may be obtained by removing from the 3D scene the points that are visible from the first viewpoint (the texture of which being stored in the first part) and by projecting the remaining points according to the same point of view. The latter process may be reiterated iteratively to obtain at each time the hidden parts of the 3D scene. According to a variant, the second parts may be obtained by removing from the 3D scene the points that are visible from the point of view, for example a central point of view, (the texture of which being stored in the first part) and by projecting the remaining points according to a point of view different from the first point of view, for example from one or more second point of view of a space of view centred onto the central point of view (e.g. the viewing space of a 3DoF rendering).

Central view 61 may be seen as a first large texture patch (corresponding to a first part of the 3D scene) and the second parts 62 comprises smaller textures patches (corresponding to second parts of the 3D scene that are complementary to the first part). Such an atlas has the advantage to be compatible at the same time with 3DoF rendering (when rendering only central view 61) and with 3DoF+/6DoF rendering.

Figure 7:
FIG. 7 shows an example of an atlas comprising the depth information of the points of the 3D scene of FIG. 6, according to a non-limiting embodiment of the present principles.

FIG. 7 shows an example of a central view 71 comprising the depth information of the points of the 3D scene of FIG. 6 visible from the central point of view, according to a non-limiting embodiment of the present principles. Central view 71 comprises the depth information of the points of the 3D scene that are visible from the central point of view. According to the present principles, depth information of patches 62 of FIG. 6 is not encoded in the stream. So, there is no depth patches corresponding to color patches 62. Central view 71 may be obtained in a same way as central view 61 but contains the depth information associated with the points of the 3D scene instead of the texture information.

For 3DoF rendering of the 3D scene, only one point of view, typically the central point of view, is considered. The user may rotate his head in three degrees of freedom around the first point of view to watch various parts of the 3D scene, but the user cannot move this unique point of view. Points of the scene to be encoded are points which are visible from this unique point of view, and only the texture information is needed to be encoded/decoded for the 3DoF rendering. There is no need to encode points of the scene that are not visible from this unique point of view for a 3DoF rendering as the user cannot access to them.

For a 3DoF+ or 6DoF rendering, depth information of points not visible from central view 61 and 71 is missing. Circuit 231 of renderer 23 of FIG. 2 produces a viewport image according to the location and direction of the current point of view, but holes, corresponding to parts of the 3D scene dis-occluded by the displacement of the point of view from the central pose to the current pose, appear in the viewport image. According to the present principles, these holes are filled by a patch based inpainting algorithm which uses color patches 62 instead of patches created from the generated viewport image.

Figure 8:
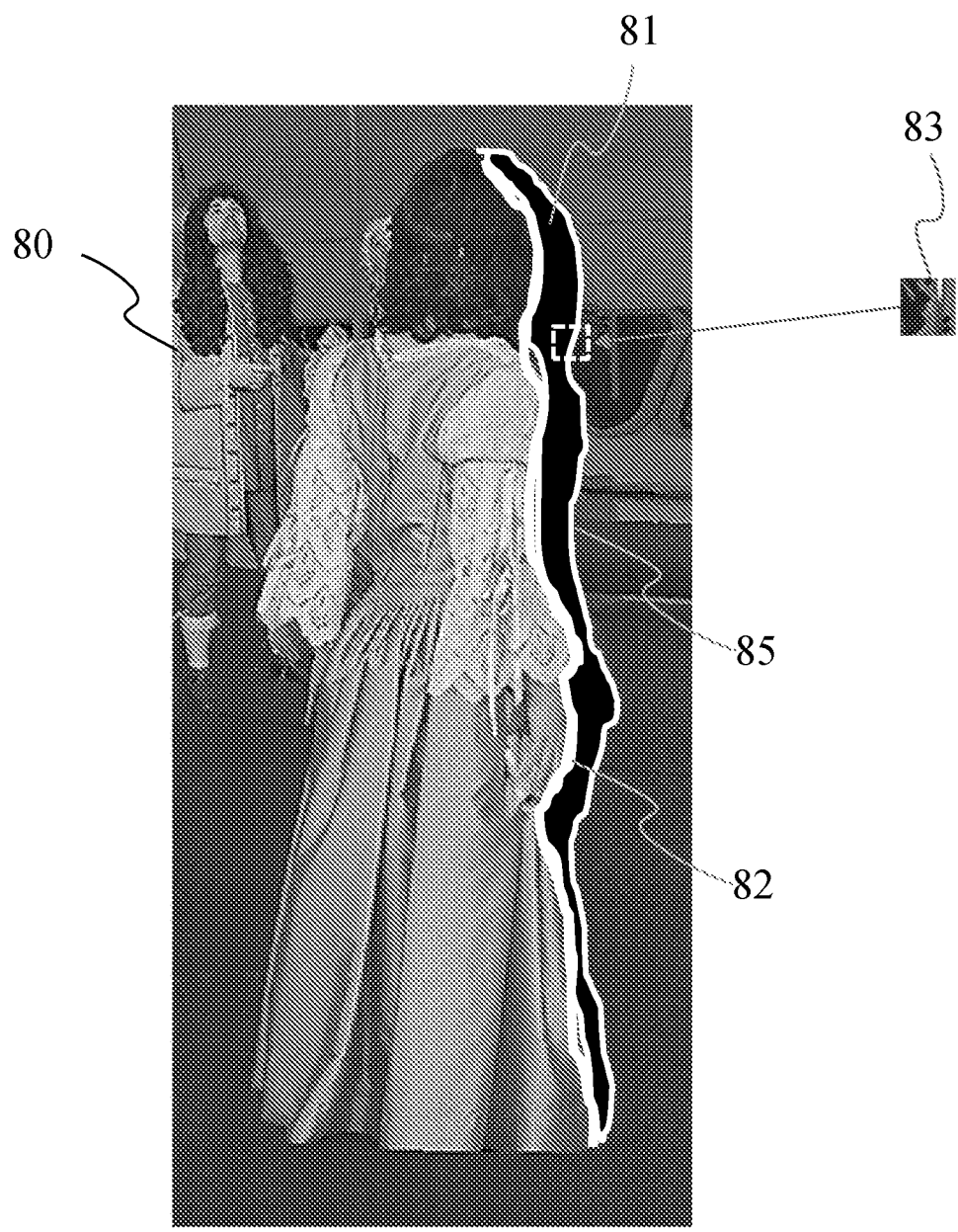
FIG. 8 shows a viewport image generated from the central view for a current point of view at the right side of the central point of view, according to a non-limiting embodiment of the present principles.

FIG. 8 shows a viewport image 80 generated from the central view for a current point of view at the right side of the central point of view. Pixels of viewport 80 are set by a capture of de-projected points of the 3D scene by a virtual camera located at the current point of view and oriented in the direction of view. In the example of FIG. 8, the current point of view is ten centimetres shifted to the right. As a consequence, a part 81 of the viewport cannot be filled as there is no point to capture at this place according to the current location and direction of view. Area 81 corresponds to a part of the 3D scene that is dis-occluded when the point of view is displaced from the central location to the current location at the right. According to the present principles, the viewport is rendered by first de-project the point cloud reconstructed from the central texture plus depth view. As the rendering point of view is shifted from the central viewpoint, disocclusion holes appear in the rendered viewport, as depicted in FIG. 8. Then, the frontiers of each disocclusion hole to fill are segmented between foreground object border 82 (no continuity with) and background border 85 (called "filling-front", a continuity with has to be enforced) as depth information is available on that border. A two-class clustering of depth values yields such segmentation. A state-of-the-art exemplar-based or patch based inpainting algorithm is adapted to fill in the disocclusion holes, taking the candidate patches from the occluded texture patches and not within the already projected visible background. Starting from the filling front; the best matching patches 83 are iteratively stitched to the filling front, until the hole is completely inpainted. A patch 83 is selected as a best fitting patch according to its location in the 3D space; this location is retrieved by using information of the patch data item associated to the patch.

FIG. 9 illustrates a patched warped to be used as an input of a patch based inpainting algorithm. A patch 91 is image data representative of a projection 92 of a part 90 of the 3D scene onto an image plane. Projection 92 is equivalent to the acquisition of part 90 of the 3D scene by a camera 92. Location, direction and parameters of projection 92 are formatted in a piece of metadata, called a patch data item, and encoded in association with patch image data 91. Part 90 may not be flat. According to the present principles, only the color component of points of part 90 are projected onto patch 91. So, the depth information is lost. Only a distance 93 between center of projection 92 and part 90 is stored in the patch data item.

At decoding side, texture patches (i.e. color patches) are post-processed to dynamically adapt the appearance of patches to the current viewpoint. To be used as an input to the patch based inpainting algorithm, a patch is warped to account for the change of point of view between virtual camera 92 which captured patch 91 and current virtual camera 94 used to generate the viewport image. Assuming a planar patch surface model (and a perspective projection model) such warping boils down to an homography, the coefficient of which only depend on the translation and the rotation between the two cameras and distance 93. Following equations provide the coefficients of such a parametrical transform, from the camera translation T and rotation Q, distance 93 to the patch Z (and camera focal lengths f and pixel aspect ratio α).

$$\begin{cases} x' = \dfrac{h_{00}x + h_{01}y + h_{02}}{h_{20}x + h_{21}y + h_{22}} \\ y' = \dfrac{h_{10}x + h_{11}y + h_{12}}{h_{20}x + h_{21}y + h_{22}} \end{cases}$$

with:

$$\begin{cases} h_{00} = \alpha \dfrac{f_c}{f_p} Z_s \cos\Omega_Z \cos\Omega_Y \\ h_{01} = \dfrac{f_c}{f_p} Z_s (\sin\Omega_Z \cos\Omega_X - \cos\Omega_Z \sin\Omega_Y \sin\Omega_X) \\ h_{02} = -\alpha\, f_c \left( \cos\Omega_Z \cos\Omega_Y T_X + \begin{pmatrix} \sin\Omega_Z \cos\Omega_X - \\ \cos\Omega_Z \sin\Omega_Y \sin\Omega_X \end{pmatrix} T_Y \right) \\ h_{10} = -\dfrac{f_c}{f_p} Z_X \sin\Omega_Z \cos\Omega_Y \\ h_{11} = \dfrac{f_c}{f_p} Z_s (\cos\Omega_Z \cos\Omega_X + \sin\Omega_Z \sin\Omega_Y \sin\Omega_X) \\ h_{12} = f_c \begin{pmatrix} \sin\Omega_Z \cos\Omega_Y T_X - \\ (\cos\Omega_Z \cos\Omega_X + \sin\Omega_Z \sin\Omega_Y \sin\Omega_X) T_Y \end{pmatrix} \\ h_{20} = -\dfrac{1}{f_p} Z_X \sin\Omega_Y \\ h_{21} = -\dfrac{1}{f_p} Z_s \cos\Omega_Y \sin\Omega_X \\ h_{22} = Z_s + \sin\Omega_Y T_X + \cos\Omega_Y \sin\Omega_X T_y \end{cases}$$

In the context of a simplified 3DoF+ transmission format, the present principles guarantee the reconstruction of dis-occluded areas, even in situations when simple inpainting propagation from background would provide annoying visual artifacts. This enables a valuable tradeoff between decoder complexity, transmission bit rate, and visual quality.

FIG. 10 illustrates a method 100 for encoding a 3D scene prepared to be viewed from a point of view within a viewing zone according to a non-limiting embodiment of the present principles. At a step 101, image data representative of a central view of the 3D scene is obtained. The central view is obtained by projecting points of the 3D scene visible from a point of view determined as central in the viewing zone onto an image plane. Different projections are suitable for this operation like a sphere projection and mapping, a cube projection and mapping, a perspective projection or an orthogonal projection. The projection mode is selected according to the viewing zone, for example, whether the user has the possibility to look behind him relatively to the initial direction of view. Pixels of the central view comprise at least a color component and a depth component. The color component of pixels of an image forms the texture of the image. In a variant, two central view are obtained, one carrying the texture information and one carrying the depth information. At a step 102, a set of patches are obtained, each patch being associated with a patch data item. The set of patch data items form a piece of metadata called patch data. A patch is image data representative of a part of the 3D scene projected onto an image plane. In this sense, the central view is a big patch. Pixels of patches comprise a color component. In a preferred embodiment, patches carry only a texture information and no depth information. This has the advantage to lighten the stream bitrate. A patch data item comprise data representative of the projection used to generate the patch and a distance from the center of projection (i.e. a point in the viewing zone) and the projected part of the 3D scene. This distance maybe, for example, an average distance of the distances between points of the projected part and the center of projection. In a preferred embodiment, the clustering algorithm used to generate patches is parameterized to enforce small enough patches, so that they can be approximated with planar surfaces. Patches are generated so they encode points of the 3D scene not visible from the central point of view but visible from another point of view in the viewing zone. In other words, patches encode the texture information of potentially dis-occluded part of possible viewports at the rendering side. At a step 103, central view(s), patches and metadata are encoded in a data stream.

FIG. 11 illustrates a method 110 for rendering a 3D scene for a point of view and a direction of view in a viewing zone, according to a non-limiting embodiment of the present principles. At a step 111, a data stream encoding a 3D scene according to the present principles is obtained. A central view and a set of patches are decoded from the stream. The central view is image data representative of a projection of points of the 3D scene visible from a 3D center point at a center of the viewing zone onto an image plane. Pixels of the central view comprise a color component and a depth component. A patch is image data representative of a projection of a part of the 3D scene, pixels of a patch having a color component. A patch is associated with a piece of metadata, called patch data item, which comprises parameters representative of the projection and a distance from a center of said projection to said part of the 3D scene. At a step 112, the 3D scene is rendered onto a viewport image as viewed from the current point of view. The viewport image is generated with points of the 3D scene retrieved from the central view according to the current point of view. As the current point of view may be shifted in the viewing zone relatively to the central point of view, the viewport image comprises scene regions (i.e. pixels valued with color component of de-projected points) and dis-occluded regions (i.e. non-valued pixels because they correspond to regions of the 3D scene not visible from the central point of view and, so, not encoded in the central view) as illustrated in FIG. 8. At a step 113, patches are warped according to the relative poses of virtual cameras associated with the projection point of view according to which the patch has been captured (and which is described in the associated patch data item) and the current point of view and the distance stored in the patch data item. Then, warped patches are inputted in an exemplar-based or a patch based inpainting algorithm adapted to fill in the disocclusion holes, taking the candidate patches from the warped patches and not within the already projected visible background.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
    decoding a view and at least one patch from a data stream, the view being image data representative of a projection of points of a 3D scene visible from a first point of view within a viewing zone onto an image plane according to an omnidirectional mapping, pixels of the view having a color component and a depth component;
    a patch being image data representative of a projection of a part of the 3D scene visible from a second point of view in the viewing zone, pixels of a patch having a color component; and
    a patch being associated with data comprising a location and a direction of said second point of view and a distance between said second point of view and said part of the 3D scene;
    de-projecting pixels of the view onto a viewport image according to a rendering point of view, said viewport image comprising at least one scene region and at least one dis-occluded region; and
    inpainting the at least one dis-occluded region of said image with said at least one patch.

2. The method of claim 1, wherein the inpainting comprises a warping of a patch as a function of said distance, said second point of view and said rendering point of view.

3. The method of claim 2, wherein the warping of a patch is an homography parametrized by:
    said distance from said rendering point of view to said part of the 3D scene, and
    a translation and a rotation between said rendering point of view and said second point of view.

4. The method of claim 1, wherein the inpainting comprises:
    segmenting a dis-occluded region in the viewport image between a foreground border and a background border; and
    iteratively stitching said patches in said dis-occluded region from background border to foreground border.

5. A device comprising a processor configured for:
    decoding a view and at least one patch from a data stream, the view being image data representative of a projection of points of a 3D scene visible from a first point of view within a viewing zone onto an image plane according to an omnidirectional mapping, pixels of the view having a color component and a depth component;
    a patch being image data representative of a projection of a part of the 3D scene visible from a second point of view in the viewing zone, pixels of a patch having a color component; and
    a patch being associated with data comprising a location and a direction of said second point of view and a distance between said second point of view and said part of the 3D scene;
    de-projecting pixels of the view onto a viewport image according to a rendering point of view, said viewport image comprising at least one scene region and at least one dis-occluded region; and
    inpainting the at least one dis-occluded region of said image with said at least one patch.

6. The device of claim 5, wherein the processor is configured to perform the inpainting by warping a patch as a function of said distance, said second point of view and said rendering point of view.

7. The device of claim 6, wherein said processor is configured to warp patches as an homography parametrized by:
   said distance from said rendering point of view to said part of the 3D scene, and
   a translation and a rotation between said rendering point of view and said second point of view.

8. The device of claim 5, wherein the processor is configured to perform the inpainting by:
   segmenting a dis-occluded region in the viewport image between a foreground border and a background border; and
   iteratively stitching said patches in said dis-occluded region from background border to foreground border.

9. A method comprising:
   obtaining a view of a 3D scene,
   the view being image data representative of a projection of points of the 3D scene visible from a first point of view within a viewing zone onto an image plane according to an omnidirectional mapping, pixels of the view having a color component and a depth component;
   obtaining a set of patches, a patch being image data representative of a projection of a part of the 3D scene visible from a second point of view in the viewing zone, pixels of a patch having a color component;
   a patch being associated with data comprising a location and a direction of said second point of view and a distance between said second point of view and said part of the 3D scene; and
   encoding said view, said set of patches and said data in a data stream.

10. The method of claim 9, wherein the distance between said second point of view and said part of the 3D scene is an average distance or a median distance or a shortest distance or a longest distance of distances between said second point of view and points of the part of the 3D scene.

11. A device comprising a processor configured for:
   obtaining a view of a 3D scene,
      the view being image data representative of a projection of points of the 3D scene visible from a first point of view within a viewing zone onto an image plane according to an omnidirectional mapping, pixels of the view having a color component and a depth component;
   obtaining a set of patches
      a patch being image data representative of a projection of a part of the 3D scene visible from a second point of view in the viewing zone, pixels of a patch having a color component;
      a patch being associated with data comprising a location and a direction of said second point of view and a distance between said second point of view and said part of the 3D scene; and
   encoding said view, said set of patches and said data in a data stream.

12. The device of claim 11, wherein the processor determines the distance between said second point of view and said part of the 3D scene as an average distance or a median distance or a shortest distance or a longest distance of distances between said second point of view and points of the part of the 3D scene.

* * * * *